United States Patent
Vogel

(10) Patent No.: US 6,804,884 B1
(45) Date of Patent: Oct. 19, 2004

(54) METHOD FOR THE PRODUCTION OF AN ASSEMBLED CAMSHAFT AND DEVICE FOR IMPLEMENTING SAID METHOD

(75) Inventor: Manfred Vogel, Kappelrodeck (DE)

(73) Assignee: Erich Neumayer GmbH & Co. KB, Hausach (DE)

(*) Notice: Subject to any disclaimer, the term of this patent is extended or adjusted under 35 U.S.C. 154(b) by 46 days.

(21) Appl. No.: 10/048,983
(22) PCT Filed: Aug. 10, 2000
(86) PCT No.: PCT/EP00/07812
§ 371 (c)(1),
(2), (4) Date: Jul. 2, 2002
(87) PCT Pub. No.: WO01/12956
PCT Pub. Date: Feb. 22, 2001

(30) Foreign Application Priority Data

Aug. 16, 1999 (DE) .......................... 199 38 791

(51) Int. Cl.⁷ .............................. B21K 1/12; B23Q 3/00
(52) U.S. Cl. ..................... 29/888.1; 29/888.08; 29/446; 29/458; 29/559; 123/90.6; 74/567
(58) Field of Search ........................... 29/888.1, 888.08, 29/446, 447, 458, 464, 467, 468, 559, 525, 281.1; 123/90.6; 74/567, 569; 403/282, 285; 269/305, DIG. 910

(56) References Cited

U.S. PATENT DOCUMENTS

| | | | |
|---|---|---|---|
| 3,608,886 A | * | 9/1971 | Greene ........................ 269/305 |
| 4,582,243 A | * | 4/1986 | Myer .......................... 228/115 |
| 4,621,797 A | * | 11/1986 | Ziegenfuss .................... 269/34 |
| 4,798,178 A | * | 1/1989 | Greulich et al. ........... 123/90.6 |
| 5,031,547 A | * | 7/1991 | Hirose ........................ 108/140 |
| 5,272,930 A | * | 12/1993 | Nakamura et al. ............. 74/434 |
| 5,299,881 A | | 4/1994 | Mettler-Friedli ............ 403/274 |
| 5,307,708 A | | 5/1994 | Matt ............................ 74/567 |
| 5,348,210 A | * | 9/1994 | Linzell ........................ 228/115 |
| 5,538,346 A | * | 7/1996 | Frias et al. ................... 384/49 |
| 5,641,371 A | * | 6/1997 | Sanko ......................... 156/228 |

FOREIGN PATENT DOCUMENTS

| | | |
|---|---|---|
| DE | 35 40 979 | 1/1987 |
| DE | 41 21 951 | 12/1992 |

OTHER PUBLICATIONS

Patent Abstracts of Japan; JP 58 074811; May 6, 1983.
Patent Abstracts of Japan; JP 60 152665; Aug. 10, 1985.

\* cited by examiner

*Primary Examiner*—Marc Jimenez
(74) *Attorney, Agent, or Firm*—Jacobson Holman PLLC

(57) ABSTRACT

A method for producing an assembled shaft, especially an assembled camshaft, whereby parts, especially cams, are placed on a shaft in predetermined axial and peripheral positions and joined by compression pressure in a friction-tight manner. The cams in the thrust direction have a lubrication groove which surrounds the inner bore thereof and which is essentially wedge-shaped with a linear or curved slope, running in the direction of the wall of the bore. When the cam is slid on the shaft into the predetermined axial position, a lubricant is introduced into the groove. This lubricant is pulled continuously groove into the inner bore of the cam during the push-on process to significantly reduce friction between the inner bore and the shaft.

18 Claims, 1 Drawing Sheet

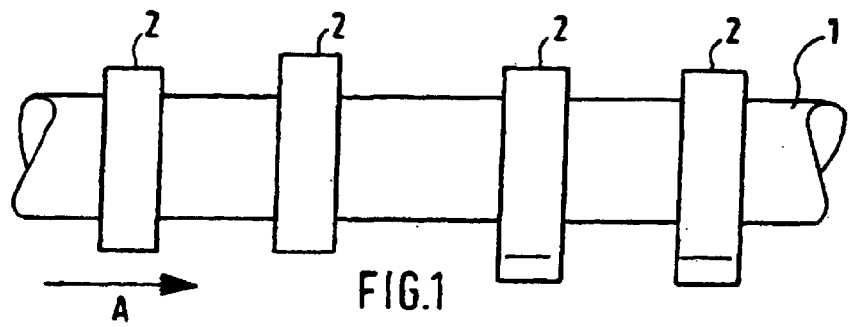
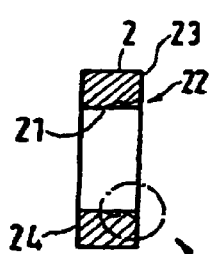
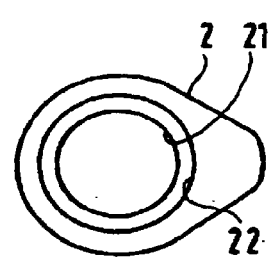
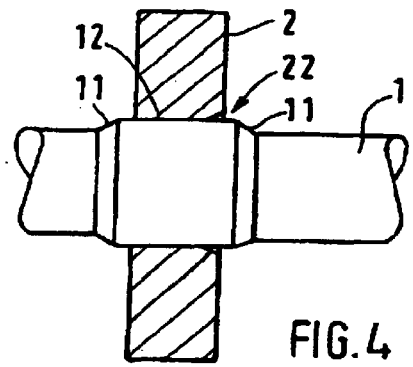
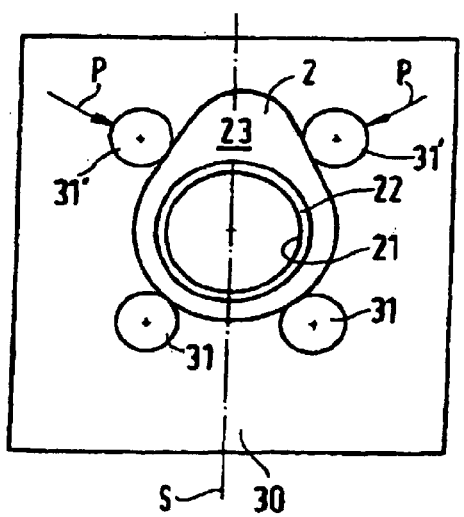
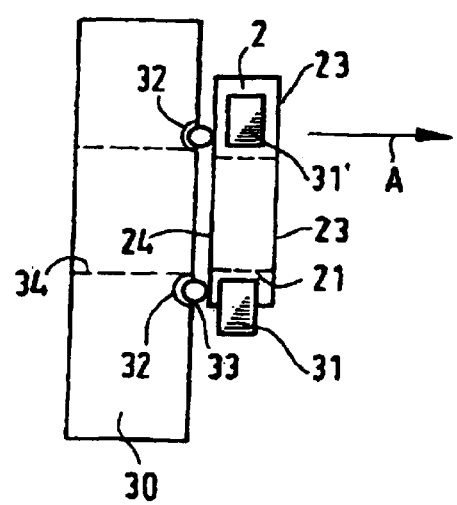

METHOD FOR THE PRODUCTION OF AN ASSEMBLED CAMSHAFT AND DEVICE FOR IMPLEMENTING SAID METHOD

This is a nationalization of PCT/EP00/07812 filed Aug. 10, 2000 and published in German.

BACKGROUND OF THE INVENTION

1. Field of the Invention.

The invention relates to a method for the production of an assembled camshaft and a device for implementing said method.

2. Description of the Related Art

The U.S. Pat. No. 5,299,881 discloses an assembled camshaft, where the individual cams and the corresponding shaft are prefabricated in separate production steps, and then the cams are pushed in such a manner on the shaft by means of a special joining technology that there is a play-free fit between the shaft and the cams. Each prefabricated cam exhibits an inner bore and at least two axially separated annular zones, which are separated from one another by at least one free space, which is located in the inner bore of the cams. The space and the zones are symmetrical to the central plane of the cams. To manufacture the assembled camshaft, the individual cams are pushed onto the shaft so that the result is a fit between the said zones and the periphery of the shaft. One problem lies in the fact that it is relatively difficult and problematic to push the said cams on, in particular when the cams are pushed on or over the areas, where they are supposed to be fixed in position. In addition, the cams exhibit a relatively complicated design.

SUMMARY OF THE INVENTION

The object of the present invention is to provide a method for the production of assembled camshafts, by means of which the push-on operation of the cams onto the corresponding shaft is improved.

This problem is solved by means of a method for the production of an assembled camshaft where parts, in particular cams, are pushed by means of joining operations on a shaft into predetermined axial positions and specified circumferential positions with friction contact due to the fit connection. The cams in the thrust direction of the cams or the shaft, seen in its front face, exhibit a groove which surrounds the cam's inner bore and which is designed essentially wedge-shaded and exhibits a linear or curved slope, running in the direction of the inner wall of the bore. When a cam is slid on the shaft into the predetermined axial position and optionally when the cam is rotated into the specified circumferential position, a lubricant is introduced into the groove serving as the lubricant groove, this lubricant being pulled continuously out of the groove into the inner bore of the cam during the push-on process.

The present invention further includes a joining device for implementing this method. The joining device includes a holding member with at least two rolls, which lie opposite one another and engage on the linear side faces of a cam and which can be forced by means of a force against the side faces, in order to orient the line of symmetry of the cam held in the holding member with respect to the line of symmetry between the opposing rolls, whereby then the rolls are opposite one another vertically to the line of symmetry of the cam.

The important advantage of the present invention lies in the fact that the pushing of the individual cams onto the shaft is facilitated significantly by means of a front wedge-shaped lubricant groove or chamfer, provided in the area of the inner bore of the cams in the push-on direction, because lubricant, introduced into this lubricant groove, is pulled continuously into the inner bore of the groove during the push-on process as a consequence of the wedge-shaped design of the groove, so that the friction between the outer circumference of the shaft and the inner circumference of the inner bore of the groove is significantly reduced. When a cam is pushed onto the shaft, it can also be easily rotated in an advantageous manner into the predetermined peripheral position due to the aforementioned lubrication through the wedge-shaped groove. In an advantageous design of the invention, there is not only the front lubricant groove but also other lubricant grooves on the inside of the cam, and in particular not symmetrical to the central plane of the cam. The shape of the wedge-shaped lubricant grooves is optimal.

According to preferred embodiments of the method, the groove may have in essence a wedge shape and exhibit a slope, which runs linearly or curved in the direction of the inner wall of the bore. This groove forms an approach slope when introducing the shaft into the inner bore of the cam. At least one other lubricant groove may be included, in addition to the lubricant groove. The lubricant groove and the at least one other lubricant groove may be designed identically or may differ with respect to the angle of their slopes and/or with respect to their widths.

According to further embodiments of the method, the shaft can exhibit, in the area of the predetermined axial positions of the cams, fixing areas with a diameter which is larger with respect to the other outside diameter of the shaft, whereby the grooves of the cams form an approach slope when the cams are slid onto the fixing areas. The fixing areas may exhibit an approach slope at least on their side facing the cam during the push-on operation.

As a further embodiment of the method, a lubricant may be introduced into the lubricant groove during the joining operation. This lubricant can be treated in such a manner selectively after the joining operation that it loses its friction-reducing function. Such loss of its friction-reducing function after the joining operation may be due to the heating up of the assembled camshaft.

According to preferred embodiments of the joining device for implementing the method, two additional opposing rolls may engage on the cylindrical periphery of the cam below the first two rolls. The holding member can exhibit an axial thrust bearing, which allows the cam to be rotated into the specified circumferential position prior to the execution of a relative motion between the holding member and the shaft or during or after the execution of the relative motion. The axial thrust bearing exhibits in the circumferential direction over a circular arc uniformly distributed depressions, in which there are roller bodies, whose sides facing the cam project beyond the side of the holding member facing the cam and rest against the side of the cam facing the holding member. These roller bodies may be embodied as balls.

According to further preferred embodiments, the joining device may exhibit a plurality of cams, which are held in holding members in the circumferential direction in specified positions and in the axial direction in predetermined positions, whereby holding members with the cams are pushed onto the shaft in one operation or the shaft is pushed into the cams in one operation.

The invention and its embodiments are explained in detail below in conjunction with the figures.

BRIEF DESCRIPTION OF THE DRAWINGS

FIG. 1 depicts a prefabricated, assembled camshaft;

FIG. 2 is a sectional view of a cam, designed according to the invention;

FIG. 3 is a view of the cam of FIG. 2, in the push-on direction, as seen from the front;

FIG. 4 depicts an arrangement of a cam on a fixing area of the shaft that exhibits a diameter that is larger than the diameter of the rest of the areas of the shaft; and FIGS. 5 and 6 depict a preferred device for implementing the method of the invention.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIG. 1 depicts an assembled camshaft, which comprises a shaft 1, on which cams 2 are pushed into predetermined axial positions, for example in the push-on direction A. The individual cams 2 of the assembled camshaft are also arranged in specified positions, when seen in the circumferential direction of the shaft 1.

It is evident from FIGS. 2 and 3 that, when seen in the push-on direction A, the cams, used in connection with the inventive method, exhibit in the area of their front side 23 at least a wedgeshaped and annular lubricant chamfer or groove 22, which envelops the inner bore 21 and runs, starting from the front side 23 of the cam 2, obliquely toward the inside as far as up to the inside diameter of the inner bore 21. In so doing, the slope can be designed as a straight line or curved. In addition to the said groove 22, there can be one or more other grooves 22. However, they are not arranged symmetrically to the longitudinal central plane of the cam 2, but rather oriented in the direction of the front side 23 of the same. The lubricant grooves 22 can exhibit the same shape or differ with respect to the angle of the slope or the width of the grooves.

The lubricant groove 22 fulfills two different functions. First, a lubricant is introduced into said groove during the push-on operation. During the push-on operation the lubricant is pulled continuously inwardly in the direction of the inner circumference of the inner bore 21 of the cam 2 due to the wedge-shaped nature in the lubricant groove 22 so that the inside face of the inner bore 21 is lubricated during the entire push-on process so that the cam 2 can be displaced on the shaft 1 to the predetermined axial position in the push-on direction A at reduced friction.

Owing to the said lubrication the goal is also reached that the cam 2 can be rotated to its predetermined axial position before the displacement, during this displacement or after reaching its axial position in the circumferential direction of the shaft 1 until it reaches its specified circumferential position.

To restore again the friction, decreased by the lubricant, after the arrangement of the cam in the predetermined axial position and the specified circumferential position, a lubricant is preferably used that after the arrangement of all cams 2 in the predetermined axial positions and the specified circumferential positions, is treated in such a manner that its friction-reducing effect is cancelled. For example, when a specific lubricant is used, this effect is achieved by heating the assembled camshaft. As the lubricant heats up, the result is the desired cancellation of the friction-reducing effect.

Furthermore, with the lubricant groove 22 the goal is reached that the cams 2 are centered automatically when put on the circumference of the shaft 1. This centering is especially important when the cams are arranged, according to FIG. 4, on a shaft 1, which exhibits at the predetermined axial positions of the cams 2 fixing areas 12 with a diameter that is larger than the diameter of the shaft 1 in the other areas. When the cams 2 are slid to the respective predetermined axial positions, the lubricant grooves 22 of the cams 2 serve as the centering aids. To achieve a still better centering of the cams 2 on the fixing areas 12, they can exhibit so called approach slopes 11 especially on their sides facing the cams 2 in the push-on direction A.

A preferred device for pushing on the cams 2 into the predetermined and specified positions is explained below in conjunction with the FIGS. 5 and 6.

When the cams 2 are put on the shaft 1, it is relevant that not only the accuracy of shape and the axial position must agree exactly, but also the orientation of the cams 2 in the circumferential direction must fit exactly to one another. This state can be reached with the joining device of the invention. It exhibits on a preferably plate-shaped holding member 30 at least three, expediently, however, at least four rolls 31, which can engage on the periphery of a cam 2. Preferably two rolls 31 are arranged in such a manner that they are arranged below the cam 2, disposed according to FIG. 5, and in particular symmetrically to the line of symmetry S of the cam 2. Therefore, they support the cam 2 in its circular area. Two other rolls 31' are arranged in such a manner above the rolls 31 symmetrically to the said line of symmetry S of the cam 2 that they rest against the linear side faces of the cam 2. When at this stage the rolls 31' are pushed uniformly in the direction of the arrow P by means of a device (not illustrated) against the linear side faces of the cam 2, the result is that the cam 2 in the holding member 30 is oriented exactly in the illustrated position in which its line of symmetry S lies exactly on the line of symmetry of the opposite rolls 31, 31 and 31', 31'.

In the holding plate 30 there is an opening 34, through which the shaft 1 can be passed during the joining operation.

To orient the cams 2 in the circumferential direction, either the shaft 1 is rotated during the joining operation about a specified angle with respect to the holding member, in which the cam is held exactly in the said position, or the holding member 30 is rotated about the specified angle with respect to the shaft 1.

So that the rotation of the cam 2 with respect to the holding member 30 is possible, the holding plate 30 exhibits an axial bearing that can absorb the axial thrust force of the holding plate 30 and can transfer it to the cam 2 and that exhibits depressions 32, which are arranged on a circular arc and in which there are preferably balls 33 that are braced, on the one hand, against the floor of the depressions 32 and, on the other hand, against the rear side 24, which belongs to the cam 2 and which lies opposite the front side 23.

The operating mode of the joining device described above is as follows. First, a cam 2 is arranged and oriented in the holding member 30 in the manner described above.

Then the shaft 1 is displaced in such a manner with respect to the holding member 30 or the holding member 30 is displaced in such a manner with respect to the shaft 1 that the end of the inner bore 21 of the cam 2 that faces the cam 2 gets onto the end of the shaft 1. Then owing to the said relative motion between cam 2 and shaft 1 the cam 2 is slid up to its predetermined axial position, whereby the lubrication to facilitate the displacement is done by means of the lubricant introduced into the groove(s) 22.

The above described rotation of the cam 2 in the circumferential direction is done preferably before the axial relative motion between cam 2 and shaft 1. However, it is also conceivable to execute the rotation during the relative motion, that is, therefore before reaching the predetermined axial position, or as an alternative after executing the relative motion and after reaching the predetermined axial position.

It is pointed out that, according to the method described above and with the joining device, explained above, not only cams, but also other parts, such as axial bearing rings, angle sensors, end pieces etc. can be put on the shaft 1, whereby with respect to the joining operation these parts are designed just like the cam 2.

The present method can also be implemented in such a manner that the joining device comprises several holding members 30, in which the cams are held in predetermined axial positions and in specified circumferential positions. The cams 2, held in such a joining device, can be pushed as one entity onto a shaft 1, or as an alternative the shaft 1 can be pushed into such a joining device and into the cam 2 held in said joining device. In this way all cams 2 reach simultaneously their axial positions and their circumferential positions on the shaft 1.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. Method for the production of an assembled shaft comprising the steps of:

pushing a part which has an inner bore by means of joining operations onto a shaft into a predetermined axial position and a specified circumferential position with friction contact due to fit connection, said part in a thrust direction having a lubricant groove which surrounds said inner bore and which is designed to be essentially wedge-shaped and exhibits a linear or curved slope, running in the direction of the inner wall of the bore; and introducing a lubricant into said groove when said part is slid on the shaft into the predetermined axial position, said lubricant being pulled continuously out of the groove into the inner bore of the part while said part is being joined with said shaft to reduce friction between an outer diameter of said shaft and the inner wall of said bore.

2. The method as claimed in claim 1, wherein the shaft is a cam shaft and the part is a cam.

3. The method as claimed in claim 1, wherein the groove forms an approach slope when introducing the shaft into the inner bore of the part.

4. The method as claimed in claim 1, wherein at least one other lubricant groove is provided in the Dart in addition to the lubricant groove.

5. The method as claimed in claim 4, wherein the lubricant groove and said at least one other lubricant groove are designed identically.

6. The method as claimed in claim 4, wherein a slope of the lubricant groove and a slope of said at least one other lubricant groove are different.

7. The method as claimed in claim 4, wherein a width of the lubricant groove and a width of said at least one other lubricant groove are different.

8. The method as claimed in claim 1, wherein the shaft includes a fixing area in the area of the predetermined axial position of the part, said fixing area having a diameter which is larger than an outside diameter of the shaft in other than said fixing area, said groove of the part forming an approach slope when the part is slid onto the fixing area.

9. The method as claimed in claim 8, wherein the fixing area includes an approach slope on at least on that side thereof facing the part during joinder with the shaft.

10. The method as claimed in claim 1, wherein said lubricant introduced into the lubricant groove for joining with said shaft is treated in such a manner after said joining operation that a friction-reducing function of said lubricant is cancelled.

11. The method as claimed in claim 10, wherein after the joining operation the friction-reducing function of said lubricant is cancelled by heating up of the assembled shaft.

12. The method as claimed in claim 1, further comprising the step of, after assembling the shaft, heating the assembled shaft to cancel the friction-reducing function of said lubricant.

13. Joining device for pushing a Dart which has an inner bore onto a shaft into a predetermined axial position and a specified circumferential position with friction contact due to fit connection, said part in a thrust direction having a groove which surrounds said inner bore and which is essentially wedge-shaped with a linear or curved slope running in the direction of an inner wall of the bore so that, when a lubricant is introduced into the above when the part is slid on the shaft into the predetermined axial position, the lubricant is pulled continuously out of the groove into the inner bore of the part to reduce friction with the shaft, said joining device comprising a holding member with at least a first two rolls, which lie opposite one another and engage on linear side faces of the part and which through application of force can be forced against the side faces in order to orient a vertical line of symmetry of the part held in the holding member with respect to a second vertical line of symmetry between said first two rolls such that the rolls are opposite one another in horizontal alignment and the second vertical line of symmetry is aligned with the vertical line of symmetry of said part.

14. The joining device, as claimed in claim 13, wherein two additional rolls arranged in opposed position relative to said vertical line of symmetry engage on a cylindrical periphery of the part below the first two rolls.

15. The joining device, as claimed in claim 13, wherein the holding member includes an axial thrust bearing which allows the part to be rotated into the specified circumferential position at any time relative to execution of a relative motion between the holding member and the shaft.

16. The joining device, as claimed in claim 15, wherein the axial thrust bearing e includes depressions uniformly distributed in the circumferential direction over a circular arc, said depressions accommodating roller bodies whose sides facing the part project beyond a side of the holding member facing the part and rest against a side of the part facing the holding member.

17. The joining device, as claimed in claim 16, wherein the roller bodies are balls.

18. The joining device, as claimed in claim 13, wherein a plurality of parts are held in a respective plurality of holding members in the circumferential direction in specified positions and in the axial direction in predetermined positions, said holding members with the parts being joined with the shaft in one operation.

* * * * *